W. HAY.
LINK CHAIN.
APPLICATION FILED JULY 26, 1917.
1,402,766.
Patented Jan. 10, 1922.
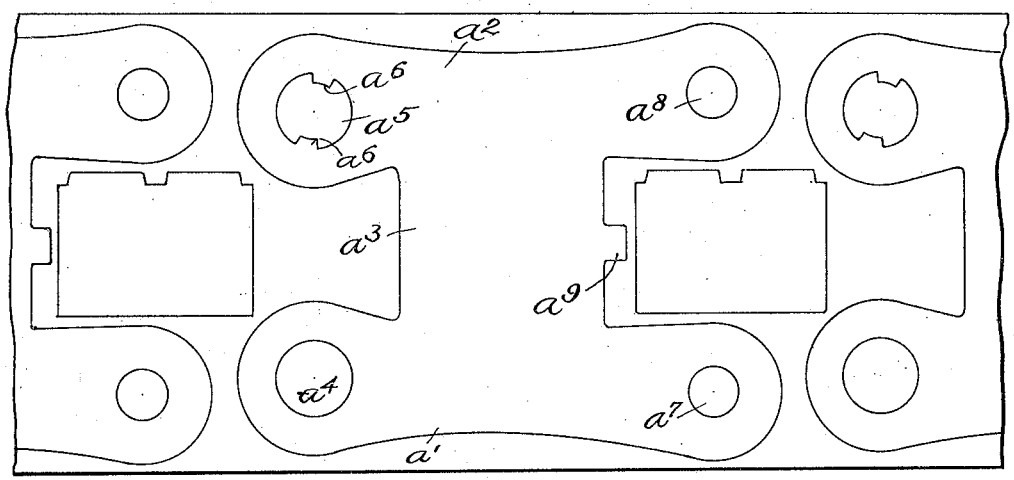
Fig. 1.
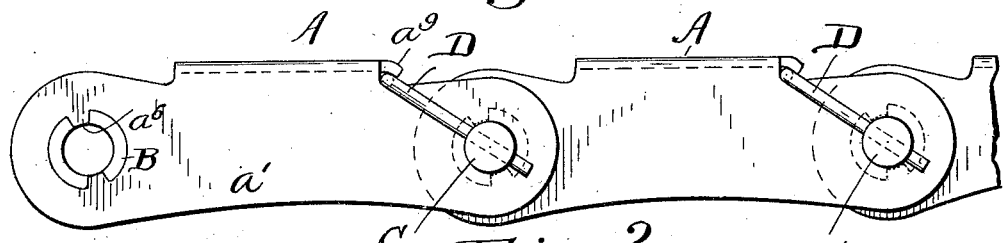
Fig. 2.
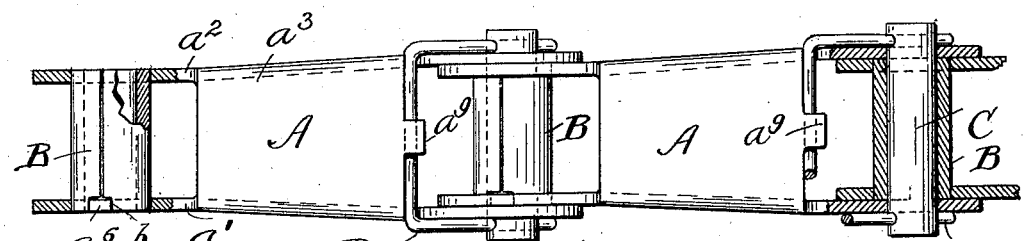
Fig. 3.
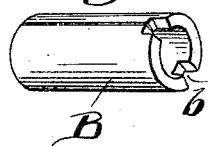
Fig. 5.
Fig. 4.
Inventor:
Walter Hay.
By Thurston & Kwis
attys

UNITED STATES PATENT OFFICE.

WALTER HAY, OF SEVILLE, OHIO, ASSIGNOR TO THE UNION CHAIN AND MANUFACTURING COMPANY, OF SEVILLE, OHIO, A CORPORATION OF OHIO.

LINK CHAIN.

1,402,766.

Specification of Letters Patent. Patented Jan. 10, 1922.

Application filed July 26, 1917. Serial No. 182,958.

*To all whom it may concern:*

Be it known that I, WALTER HAY, a citizen of the United States, residing at Seville, in the county of Medina and State of Ohio, have invented a certain new and useful Improvement in Link Chains, of which the following is a full, clear, and exact description.

This invention relates to improvements in chains employed for the transmission of power and for elevating or conveying materials, and in certain respects the invention is an improvement over the chain constituting the subject matter of my prior Patent No. 893,240, of July 14, 1908.

In my prior patent I show a chain composed of links which are formed in one piece and comprise side portions with a bridge-like connecting portion, the side portions at one end of each link being spaced further apart than at the opposite end, so that one end of one link will fit in between the extremities of the adjacent link. The overlapping portions of adjacent links are connected together by a pin and tube connection including a tube which is fitted into the extremities of one link and a pin which extends through the tube and is mounted in the extremities of the companion link, both the tube and the pin being held from turning in their respective links so that the bearing and wearing surfaces extend over the whole length of the tube.

The principal object of the present invention is to provide certain improvements which decrease the cost of manufacture, facilitate the assembling and disassembling of the parts, increase the life and durability, and otherwise render more satisfactory a link chain employed for the purposes above mentioned, and especially of the type disclosed in my prior patent.

The invention relates particularly to the elements which form the pivotal connections between the links, including the tube and pin and the manner in which they are made, assembled and detachably mounted or held in place.

The invention may be further briefly summarized as consisting of certain novel details of construction and combinations and arrangements of parts which will be described in the specification and set forth in the appended claims.

In the accompanying sheet of drawings, Fig. 1 is a plan view of a strip illustrating the preferred way in which the link blanks and tube forming blanks are economically punched from sheet metal; Fig. 2 is a side view of a portion of a chain embodying my invention, this view showing two complete links and a portion of a third link; Fig. 3 is a top plan view of the same with parts broken away and in section; Fig. 4 is an end view of the same; and Fig. 5 is a perspective view of the tube constituting one part of the pivotal joint or connection between the links.

My improved chain is composed of similar or counterpart links A, each of which is preferably provided with side portions $a'$, $a^2$, and an integral and bridge-like connecting portion $a^3$ as shown in my prior patent. The extremities at one end of each link are somewhat closer together than the extremities at the opposite end, so that portions of two adjacent links can overlap with the narrower portion of one link fitting in between the wider portion of the adjoining link, as clearly shown in Fig. 3. The said portions $a'$, $a^2$ at one end of the link, are provided with aligned openings $a^4$, $a^5$, one of the openings, $a^5$, being provided with diametrically opposite inwardly projecting lugs $a^6$ which are preferably tapered, as clearly shown in Figs. 1 and 2. The side portions at the opposite end of the link are likewise provided with aligned openings $a^7$, $a^8$, which are somewhat smaller than the openings $a^4$, $a^5$. The openings $a^4$, $a^5$, are at the relatively narrow end of the link, and the smaller openings $a^7$, $a^8$, are at the relatively wide end of the link.

Extending from the intermediate bridging portion $a^3$, and preferably on the longitudinal center line thereof, is a projecting tongue $a^9$, the purpose of which will be explained presently, this tongue being bent or curved inward slightly as shown.

Adjacent links are fastened together by a tube and pin connection in which the principal features of the present invention are directly involved. This connection includes a cylindrical tube or sleeve B, which is fitted into the aligned openings $a^4$, $a^5$, at the relatively narrow end of each link, this tube being provided (see Fig. 5) at one end with a pair of diametrically opposite notches $b$ which receive the lugs $a^6$ at the opening $a^5$ of the link, the interfitting lugs and notches holding the tube against turning in the side portions of the link. The connection between the links includes also a cylindrical pin C which extends through the tube and has a free working fit in the latter, and is seated in the relatively small openings $a^7$, $a^8$, in the relatively wide end of the adjoining link. Additionally the connection between each pair of links includes a U-shaped pin-lock D, having parallel end portions which extend through openings near the ends of the pin C, and a bridging portion extending across one of the links alongside that end of the intermediate bridging portion $a^3$ of the link from which projects the tongue $a^9$. This pin-lock D, is held in position by the tongue $a^9$, which is bent down slightly over the bridging portion of the pin-lock, pressing it down against the side portions $a'$, $a^2$ of the link at the junction of the latter with the bridging portion $a^3$ of the link.

In assembling the links of the chain, after the pin C has been slipped into place, the ends of the pin-lock are inserted in the openings of the pin C, and the middle or bridging portion of the pin-lock is then sprung under the tongue which as before stated, is slightly downturned as shown. The tongue then holds the pin-lock against movement in any direction. At this point attention is called to the fact that this pin-lock holds the pin C against turning movement as well as endwise movement in either direction, and it very effectively prevents any spreading of the links. To remove the pin-lock it is only necessary to insert a suitable tool between the bridging portion of the pin-lock and the tongue, and spring the pin-lock out from beneath the latter. Thus it will be seen that the pin-lock can be very easily and quickly placed in position or removed.

Preferably, though not necessarily, the links and tubes are formed from blanks punched from a strip of sheet metal, and to effect as great economy as possible in material—that is to say, to minimize waste, the link blanks and tube blanks are punched from the same strip in the manner illustrated in Fig. 1, the material which lies between the four extremities of two adjacent link blanks being used in forming the tube blanks. The link blanks are flat when punched from the strip as shown in Fig. 1, and in a subsequent operation are bent into finished form. In this operation of shaping the link blanks the tongue is given the necessary downward or inward curve or bend to effectively hold the pin-lock in position when the latter is sprung beneath the same.

The construction above described has numerous important advantages over prior chain constructions, even over the construction disclosed in my prior patent, which in practice has proven to possess very great merit. For example, the pin-lock prevents the pin from turning in the link; it prevents lateral displacement of the pin in either direction; it holds the link against spreading; it does not require the flattening of one end of the pin and the forming of a shoulder as in my prior patent, so that it effects economy in construction; it is extremely easy to place and lock it in position, so that economy in assembling is effected; it is dependable even to a greater extent than the cotter-pin of my prior construction, and in a sense is trouble-proof inasmuch as with the cotter-pin the workman occasionally forgets to spread the free ends of the pin, or they become straightened, and the pin drops out; and finally it has the very important advantage that when one side of the pin becomes worn it permits the pin to be turned 180°, bringing the unworn side into service and restoring the original pitch of the chain.

Similarly with the tube or sleeve locked in the link against turning, in the manner here shown, the two oppositely disposed pairs of notches and lugs are more effective for preventing turning of the tube in the link than with only one notch and lug, and with the two oppositely disposed notches and oppositely disposed lugs, when the tube becomes worn from use, it can be turned half way around, thus enabling the unworn side to be used the same as with the pin, and permitting restoration to the original and true pitch of the chain.

While I have mentioned the chief advantages resulting from the specific improvements of the present construction, it is to be borne in mind that none of the advantages of my prior construction are lost, these including ease and smoothness of operation at the bearing surfaces, strength and durability, ease of attaching and detaching the links, and other advantages which are described with considerable detail in the specification of my prior patent.

While I have shown only the preferred construction and the preferred way of making and assembling the links of the chain and the parts which enter into the connections between the links, it will be understood that various changes can be made, and I aim in my claims to cover all modifications which do not involve a departure from the spirit and scope of my invention in its broadest aspects.

Having thus described my invention, what I claim is:

1. A chain comprising a series of connected links, means comprising a pin extending through end portions of adjacent links for pivotally connecting said links, and a pin-lock extending across one of the links and through openings adjacent the ends of the pin.

2. A chain comprising a series of connected links, means for connecting adjacent links comprising a pin extending through both links and having openings in its ends, and a substantially U-shaped pin-lock extending across one of the links and through said openings of the pin.

3. A chain comprising a series of links, means comprising a pin extending through adjacent links for connecting them together, a pin-lock extending through both ends of the pin and across one of the links, and means in said link for holding the pin-lock against movement.

4. A chain comprising a series of links, means comprising a pin extending through adjacent links for connecting them together, said pin having openings at its ends, a pin-lock having portions extending through said openings and a portion extending across one of the links, and a locking device on said link extending over the crossing portion of the pin-lock to hold the same in position.

5. A chain comprising a series of links, adjacent links having overlapping portions, a pin extending through said portions and provided with openings at its ends, a pin-lock extending through said openings and having a portion extending across one of the links, and a tongue projecting from said link and engaging the crossing portion of the pin-lock to hold the same in position.

6. A chain comprising a series of links, the extremities of one link extending in between the extremities of the adjacent link, a tube seated in the extremities of one link, a pin extending through the tube and engaging the extremities of the companion link, said pin having openings at its ends, a pin-lock extending through said openings and having a portion extending across the link whose extremities are engaged by the pin, and a tongue on the last mentioned link extending over and engaging the crossing portion of the pin to hold the same in position.

In testimony whereof, I hereunto affix my signature.

WALTER HAY.